United States Patent [19]

Wiedmann et al.

[11] Patent Number: 4,685,781
[45] Date of Patent: Aug. 11, 1987

[54] SPECTACLES WITH FASTENING DEVICE

[75] Inventors: Helmut Wiedmann, Heilbronn; Gunther Czech, Filderstadt, both, Fed. Rep. of Germany

[73] Assignee: Simro AG, Chur, Switzerland

[21] Appl. No.: 873,518

[22] Filed: Nov. 20, 1984

[30] Foreign Application Priority Data

Aug. 7, 1984 [DE] Fed. Rep. of Germany ....... 3429071

[51] Int. Cl.⁴ .............................................. G02C 1/02
[52] U.S. Cl. .................................... 351/110; 351/140
[58] Field of Search ................ 351/110, 153, 140, 145

[56] References Cited

U.S. PATENT DOCUMENTS

| 2,173,670 | 9/1939 | Splaine | 351/110 |
| 2,328,423 | 8/1943 | Cook et al. | 351/110 |
| 2,328,708 | 9/1943 | Cook et al. | 351/110 |

FOREIGN PATENT DOCUMENTS

2136802  11/1978  Fed. Rep. of Germany ...... 351/110

Primary Examiner—Rodney B. Bovernick

[57] ABSTRACT

This invention relates to spectacles in which are spectacle lens is connected to an individual component, for example a flange, by means of a fatening device. In the spectacle lens the two ends of a borehole are expanded into two borehole widenings which are engaged with a first protrusion on the flange and with a connecting element that is connected to a pin leading to the first protrusion. In addition, the flange has two further protrusions supporting themselves on the border of the spectacle lens, so that a four-point anchoring of the flange secured by the pin against pulling and by the additional protrusions against rotating is furnished on the spectacle lens and vice versa. A certain flange is suitable for given thicknesses and curvatures of the spectacle lens, because both on the front side and the back side of the spectacle lens it is not the front or back sides that define the gripping surfaces for the connecting element and first protrusion, but the borehole widening.

28 Claims, 9 Drawing Figures

SPECTACLES WITH FASTENING DEVICE

This invention relates to spectacles and, in particular, to a fastening device for supporting spectacle lenses on the frame or bridge components of the spectacles.

Various possibilities are known especially in rimless spectacles for connecting the plate glass or optical lenses with the remaining parts of the spectacles, in particular its bridge and flanges, as well as the articulation pieces of the temples. For example, the last-mentioned individual pieces can be screwed together with the flange as shown in German Petty Patent No. 8317983.6. In such a traditional means of fastening with the use of screws, either the position of the axis of the screw will be determined by the curvature of the surface of the spectacle lens against which the screwhead lies or the screwhead is only in point contact with the spectacle lens if the course of the screw axis is not determined by the curvature of the spectacle lens but by the desired alignment of the bridge or flange. Both a point contact such as this and a screw alignment, hence flange and bridge alignment, dependent upon the surface curvature are disadvantageous.

It is also known from German Petty Patent No. 7614516 how to secure the spectacle lens to the bridge or flange by the aid of a pin, the lower side of the head of which is beveled in conformity to the curvature of the lens, whereby an elastic intermediate ring is arranged between the spectacle lens and the bridge or flange. This, however, requires variously shaped pins, depending on the curvature of the spectacle glass, and does not make it possible to maintain an exact assigned position between the lens and the individual component with solely one pin, partially for the reason that the elastic intermediate ring makes for a certain degree of inexactitude.

In addition, it is also known from European patent application No. 0034501 how to cause the spectacle lens to be secured to an individual component by means of a bent plastic pin by letting the pin, owing to its bend, rest with the underside of its head flat against the curved surface of the lens, whereby to support the spectacle lens an additional supporting element is provided following the curvature of the lens on the side turned away from the pinhead. Because of this supporting element the individual component has to be adapted to each respective curvature of the lens.

From U.S. Pat. No. 187,007 it is known how to fasten a curved spectacle lens to a half-beam with the aid of two fastening devices, each of which is comprised of a grub screw attached to the half-beam and head nut screwed onto the former. Between the half-beam and the spectacle lens a protrusion has been arranged in the form of a collar set on the grub screw and it rests in a borehole widening formed at one end of a borehole in the lens accommodating the grub screw. Between the head of the head nut and the surface of the lens turned away from the half-beam an elastic gasket ring has been arranged. By means of the collar the spectacle lens is supported on the half-beam; yet the collar causes a certain interval to be kept, so that it will not be the curvature of the spectacle lens surface facing the half-beam that determines the relative position between the half-beam and the lens. However, a sufficiently rigid connection is not obtained in this known manner since the elastic ring provided to adapt to different curvatures on the spectacle lens surface pointed away from the half-beam will of necessity allow for a certain relative movement between the lens and the half-beam. In addition to this, this know type of fastening still permits of a relative turning between half-beam and lens around the axis of the grub screw. For this reason, in the known type two fastening devices are also supplied of this type for each spectacle lens. This known fastening device is not suitable for making the connection between a bridge or flange and a spectacle glass by using only one pin, which has to be relatively rigid.

U.S. Pat. No. 4,245,896 discloses a pair of spectacles in which the shank is arranged on the front side of the spectacle lens. The connection element is formed as a nut and screwed on a pin provided with a thread arranged on the rear of the lens. The lock consists of a longitudinal recess running transverse to the the borehole into which a bar-shaped element of equivalent shape fits in on the shank. In this known pair of spectacles the alignment taken by the bridge or flange is determined by the front side of the lens on which the shank rests. In the case of non-correcting sunglass lenses, for which U.S. Pat. No. 4,245,896 is concerned, this is not disrupting. But in correcting spectacle lenses this can lead, depending on the curvature of the front of the lens, to another geometry of the spectacles or can make it necessary to make subsequent corrections to the extent that these are at all possible, or to provide numerous different flanges and bridges which over the course of the shank will differ with respect to the remaining individual part in adaptation to different curvatures. It will be obvious that this is disadvantageous. Although the fastening device of this known pair of spectacles can suffice to make connection between an individual component and a lens with only one pin because of the lock, the degree of rigidity of the connections made by means of this fastening device will not suffice for any number of applications.

The task underlying this invention is that or improving on spectacles of this type is such a manner that the connection between the individual component and the spectacle lens will be as rigid and reliable as possible when only one pin is employed. Variously curved front sides and variously curved rear sides as well as varying thicknesses of the lens in the area of its edge should have little bearing on the shape of the fastening device and requires as little adaptation effort as possible.

In other words this means that the spectacles are meant to be supplied with a fastening device that fulfills high requirements with regard to rigidity and firmness of the connection, but which is universally applicable and will accommodate various curvatures of the front side and rear of the spectacle lens, as well as varied thicknesses of the lens in the area of the edge.

In the spectacles according to the invention the spectacle lens is not supported with its front or back side directly on the shank but is clamped between the connecting element and the first protrusion. The protrusion and the connecting element catch on the surfaces of the two borehole widenings, so that it is no longer the curvature of the lens and the course of the side of the lens facing the shank that determine the alignment of the individual component relative to the lens but this alignment is determined by the widenings of the boreholes. This makes it possible always to produce the same alignment of the individual component relative to each respective spectacle lens for lenses having varying thicknesses in the border area and with varying curvatures both front and back, despite the fact that one and the same individual component is used, by taking into account in shaping the borehole widening facing the shank the curvature of the side facing the shank. This means in other words that this widening of the borehole is shaped more or less deep. In addition, the possibility exists of affecting the alignment of the individual component by a choice between one formation of the second borehole widening concentric to the axis of the borehole and another widening eccentric to it.

Varying thicknesses in the area of the border of the spectacle lens can be taken into account by means of shaping one or both borehole widenings at various degrees of depth and/or by tailoring the length of the pin accordingly.

The clamping of the spectacle lens between the connecting element and the protrusion and the tension of the grip applied by the connecting element and the protrusion to the surfaces from two borehole widenings bring about a rigid and firm connection between the shank and individual component in the longitudinal direction of the pin and against rotations around the axes at right angles to the longitudinal axis of the pin. The lock against rotations around the longitudinal axis of the pin is comprised of the second protrusion and the third protrusion, both of which grip onto the edge of the spectacle lens and in this manner will keep a relatively large interval to the longitudinal axis of the pin, so that they effect a large counter-momentum against rotations around the axis. The second and third protrusions, together with the connecting element and the first protrusion, constitute a four-point anchoring and support for the lens and individual component relative to one another. This fastening device is also applicable in unchanged form for numerous different spectacle lenses since the differenes in these lenses can be taken into account by the shape of the borehole widening on them and, if necessary, by means of the length of the pin.

In advantageous preferred embodiment of the invention provision can be made for the surfaces of the two borehole widenings to be in the form of a calotte and for the connecting element to be altogether spherical in shape and formed in one piece with the pin, yet nevertheless to guarantee a sufficiently large contact surface between the connecting element and the asssigned borehole widening. The shape of the connecting element rounded off to the outside as well will fit in appearance to any given curvature of whichever side of the spectacle lens the connecting element is located on, so that the latter will be arranged preferably on the front side of the lens without harming the appearance of the spectacles. In a further preferred embodiment of this invention provision can be made for the pin and the shank to be formed separate from one another and for the connection between the aperture provided for the pin in the shank and the assigned end segment of the pin to be accomplished by inserting or introducing a practicable means of connection, as for example a cement connection or a notch connection. This will simplify considerably the assembly work in connecting the individual component with the spectacle lens. The assemblage will be similarly constituted if the opening cited is a through-borehole and the end of the pin protruding from it is flattened out into a rivet head.

Further preferred embodiments of this invention are characterized in the dependent claims.

Preferred embodiments of this invention are illustrated in the drawings and are explained in closer detail in the following. The following are shown.

| REFERENCE NUMERALS USED IN THE DESCRIPTIONS AND DRAWINGS | | | |
|---|---|---|---|
| 2 | flange | 72 | recess |
| 4 | spectacle lens | 74 | notch head |
| 6 | front side | 76 | notch hole |
| 8 | back side | 78 | shoulder |
| 10 | border | 80 | plate |
| 12 | edge | 82 | component part |
| 14 | edge | 84 | intermediate layer |
| 16 | bevel | | |
| 18 | bevel | | |
| 20 | temple | | |
| 22 | joint | | |
| 24 | shank | | |
| 26 | arm | | |
| 28 | shackle toggle joint | | |
| 30 | shackle toggle joint | | |
| 32 | hinge pin | | |
| 34 | extension | | |
| 36 | face | | |
| 38 | inner side | | |
| 40 | pin | | |
| 41 | end segment | | |
| 42 | connecting element | | |
| 44 | borehole | | |
| 46 | borehole widening | | |
| 48 | end segment | | |
| 50 | aperture | | |
| 52 | notch protrusion | | |
| 54 | protrusion | | |
| 56 | borehole widening | | |
| 58 | intermediate layer | | |
| 60 | protrusion | | |
| 62 | protrusion | | |
| 64 | intermediate layer | | |
| 66 | anchoring component | | |
| 68 | slot | | |
| 70 | rivet head | | |

In the following the first preferred embodiment is described in closer detail referring to FIG. 1 through 3. In these figures a flange 2 will be recognizable, which is connected to the lens 4 of spectacles with the aid of a fastening device to be described in greater detail below; further elements of the spectacles are not shown. The flange 2, which can also be termed as an articulating piece with the temple, has been chosen here as an individual component referring to which this invention is explained. The following description of the preferred embodiments will serve analagously for all individual components to be connected to a spectacle lens, thus in particular for a bridge.

The spectacle lens depicted is a plus lens with a curved front side 6 and a curved back side 8, whereby the curvatures of the front side 6 and of the back side 8 are different. Radially outward the lens 4 is bounded by a border 10, which transforms at a front edge 12 and a back edge 14 into the front side 6 and back side 8, resp., whereby bevels 16 & 18 are provided at the edges in the manner illustrated. A spectacle lens level is arranged for the lens 4, which can be definied, for example, by the back edge 14 and to which the border 10 essentially runs at right angles. As for the material of the spectacle lens 4, it can either be a plastic lens or mineral glass, e.g. silicate glass.

The flange 2 connects the spectacle lens 4 with a temple 20 (see FIG. 4), whereby a joint 22 is formed between the temple 20 and the flange 2. The individual component in the form of the flange 2 comprises a shank 24 running essentially parallel to the level of the lens and formed in one piece with an arm 26 running essentially at right angles to the level of the lens toward the rear, i.e. downward as seen in FIG. 1; at the lower end of this arm 26 in FIG. 4 two shackle toggle joints 28 of the joint 22 have been formed. The joint 22 is complemented by a further shackle toggle joint 30 formed on the temple 20 and a hinge pin 32 (see FIG. 4). At the end of the arm 26 turned away from the shackle toggle joint 28 the arm 26 shows an extension 34 protruding across the shank 24 to the front (also upward as in FIG. 1). This extension reaches approximately to the front edge 12 of the spectacle lens. As may be seen in FIG. 4, the arm 26 assumes its greatest height approximately in the area of the shank 24. This shank 24, the outline of which is shown in broken lines in FIG. 2, has as will be observed in FIG. 2 an essentially triangular shape, tapering off away from the arm 26. On its side facing the spectacle lens 4 the shank 24 displays an essentially flat face 36, which essentially incorporates a right angle with the inner side 38 of the extension 34 (see FIG. 1).

Figures 1, 3:
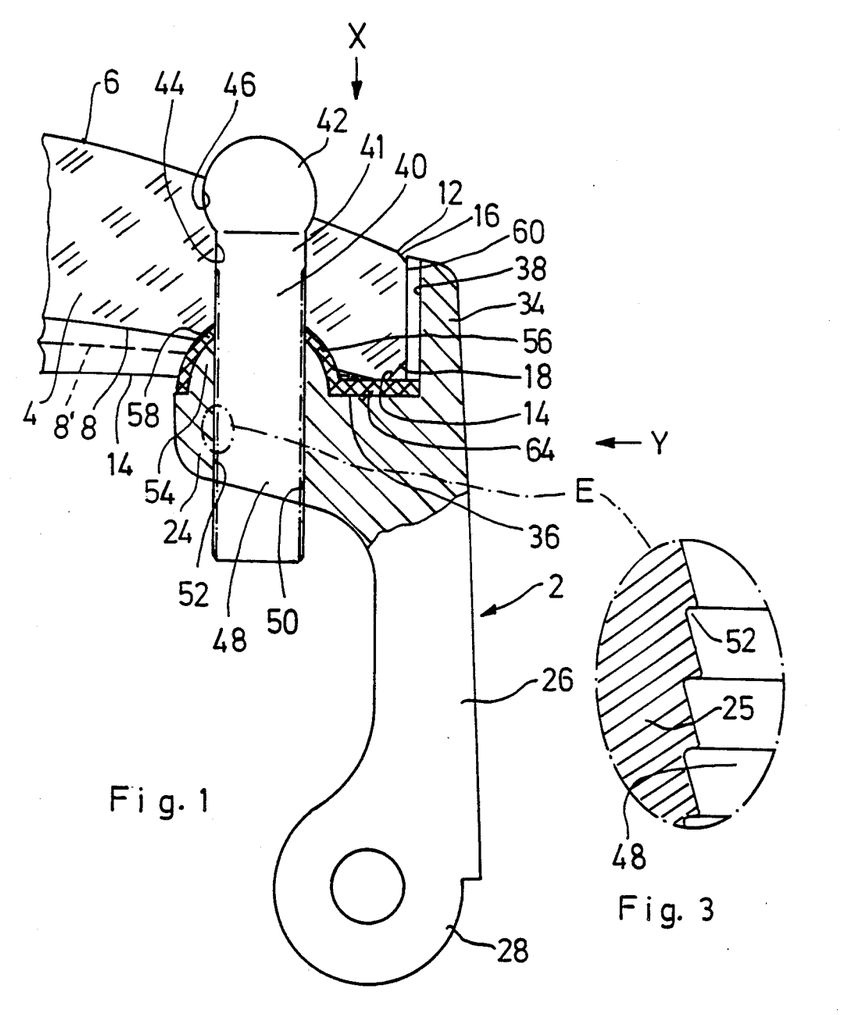
FIG. 1 is an elevation partly in section, of spectales, whereby the cutaway section depicts a flange and a border area of a spectacle lens connecting with the flange.
FIG. 3 is an enlarged representation of a detail E in FIG. 1 in section.

The fastening device, which combines the spectacle lens 4 with the individual component in the form of flange 2, is comprised of a straight pin 40 formed in one piece at its front end segment 41, the upper portion as seen in FIG. 1, with a connecting element 42 taking the form of a sphere. A cylindrical borehole 44 is formed in the lens 4 in the vicinity of its edge 10 and this borehole leads from the front side 6 to the back side 8 of the lens 4. At the end of the borehole 44 on the front side is shown an initial borehole widening 46 concentric and symmetrical in rotation to the axis of the borehole and in which the connecting element 42 sits. The two surfaces of the first borehole widening 46 and the connecting element 42 touching one another are each spherical segments. The free surface of the connecting element 42 is also a spherical face segment. The latter is visible in the preferred embodiment depicted on the front side 6 of the spectacle lens 4, over which it juts out slightly.

The cylindrical pin 40 runs through the borehole 44 and is fastened on the shank 24 with its second end segment 48, in FIG. 1 the lower end segment 24. For this purpose the shank 24 has a straight, cylindrical aperture 50 with a smooth surface. This aperture 50 in the preferred embodiment illustrated has been formed a through borehole so that on the lower side of the shank 24, turned away from the back side of the lens 4, it will be open. To make a connection between the second end segment 48 of the pin 40 and the aperture 50 as well as shank 24 there are various possibilities. Both clamping connections or screw connections in which both the second end segment 48 and the aperture 50 would be supplied with the relevant threads and cementing connections are possibilities, not to mention notch connections. The latter possibility mentioned has been selected for the preferred embodiments according to FIG. 1 through 4. For this purpose the second end segment 48 has been provided with notch protrusions 52 (see FIG. 3), in contrast to which the aperture 50 shows a smooth surface. The dimensions of the aperture 50 and of the second end segment 48 with its surrounding notch protrusions 52 have been selected in such a manner that the notch protrusions 52 impinge into the smooth surface of the aperture 50 and the material of the shank 24 flows cold, so that after the pin 40 is inserted into the aperture 50 a form-locking connection results after a certain time. This makes it possible to fasten the pin 40 in a favorable manner in any axial position desired, i.e. infinitely variable, to the shank 24. The end of the pin 40 protruding out of the aperture 50 at the second end segment 40 is trimmed in such a way that a smooth transition is furnished to the lower side of the shank 24.

On the side of the shank 24 facing the back side 8 of the spectacle lens 4 an initial protrusion 54 is formed on the shank 24 in one piece concentric to the aperture. The surface of this first protrusion 54 forms a spherical face section. The borehole 44 in the spectacle lens 4 is widened on its end facing the shank 24 into a second borehole widening 56, and this is formed concentric and symmetrical in rotation to the axis of the borehole 44. The surface of the second borehole widening is a spherical face section, whereby the surface of the second borehole widening 56 and the surface of the first protrusion 54 are situated concentric to one another at a slight interval. A thin intermediate layer 58 of elastic material is interposed between these two surfaces, so that the first protrusion 54 and the second borehole widening 56 support each other indirectly via the intermediate layer 58, as seen in the preferred embodiment, whereby it will nevertheless be possible to make for direct support by omitting the intermediate layer 58.

A second protrusion 60 in the form of a ledge and a third protrusion 62 in the form of a ledge are formed on the extension 34. The two protrusions 60 & 62 are situated respectively—looking in the peripheral direction of the spectacle lens 4—at one and the other end of the protrusion 34. As can be seen in FIG. 2, the edge 10 of the spectacle lens has a Point A nearest one of the boreholes 44. The second protrusion 60 is arranged on one side with respect to this Point A and the third protrusion 62 is arranged on the other side (viewed from the peripheral direction of the spectacle lens 4). The ledges forming the second and third protrusions run roughly at right angles to the level of the lens and are situated with one edge on the border 10. In addition, the inner side 38 of the protrusion 34 keeps a certain interval, in the preferred embodiment depicted, with the border 10. It could also just as readily run immediately along the edge between the two protrusions 60 & 62; it would also be possible for the second protrusion and the third protrusion to support themselves indirectly via an elastic intermediate layer similar to intermediate layer 58. Such an elastic intermediate layer would serve as does intermediate layer 58 to prevent concentrations of stress in the contact area of the elements and parts lying adjacent to one another and provide for a balancing out of the load. In the preferred embodiment shown in FIG. 1 through 3 the spectacle lens in supported in addition with its edge 14 on the shank 24, specifically on its face 36. This support is of an indirect type, because another intermediate layer 64 of soft, elastic material is located between the edge 14 and the face 36, and this together with the intermediate layer 58 goes to form an intermediate support.

The spectacles formed in the manner described in the above is assembled in the following manner.

First the borehole 44 is formed in the spectacle lens 4, the position of which borehole with respect to the edge 10 is determined by the position of the aperture 50 in the shank 24 relative to the second protrusion 60 and to the third protrusion 62. Although the axes of the borehole 44 and of the aperture 50, as shown in the preferred embodiment depicted, converge, these axes can be shifted to be parallel to one another and/or cut across one another since the desired alignment (aperture angle and angle or inclination) relatvie to the spectacle lens 4 and the level of the lens is essentially determined by the borehole widenings 46 and 56. Simultaneous with the formation of the borehole 44 or following upon it the second borehole widening 56 is formed, whereby in the formation of the borehole widening 56 the curvature of the back side 8 or the lens 4 is taken into account. If the back side 8, for example, has a flatter curve and takes the course of the back side 8 depicted in broken lines, the second borehole widening 56 in the lens 4 will take a deeper recess than if the back side is curved more sharply and takes the course shown in drawn-out lines (back side 8). This means in other words that the second borehole widening 56 in the lens 4 is shaped in such a manner that it will have a varying position, depending upon the course and curvature of the back side of the lens with respect to this back side 8, but will always have the identical position with respect to the shank 24 (for a certain angle of aperture).

At the front end of borehole 44 this first borehole widening 46 is shaped. A certain excess of the connecting element 42 over the front side 6 independent of the thickness of the lens 4 in the area of the borehole 44 is allowable; a certain length of the borehole 44 between the two borehole widenings can also be allowed for, so that the first borehole widening 46 will be deeper in lenses thicker at the border and less deep on lenses thinner at the border.

Figure 2:
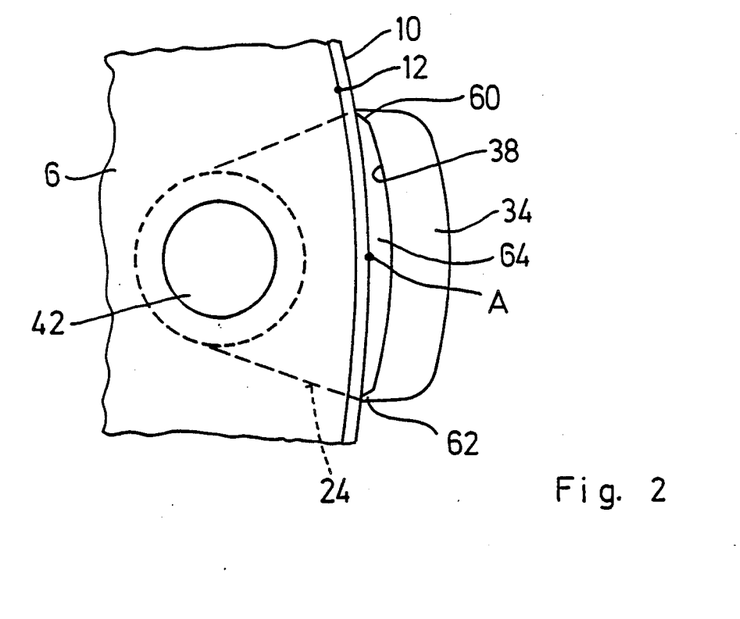
FIG. 2 is a plan view looking in direction X as seen in FIG. 1.
Figure 4:
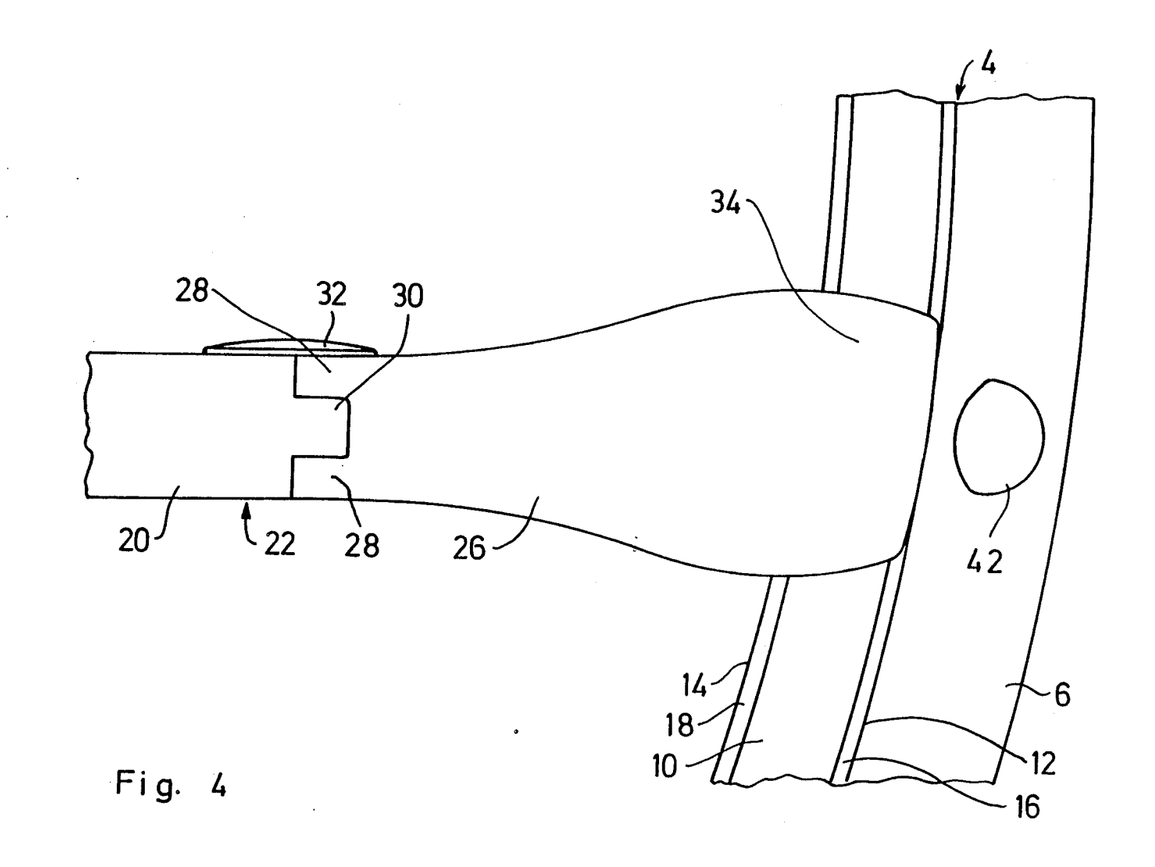
FIG. 4 is a side elevation looking in direction Y as seen in FIG. 1.

After the shaping of the spectacle lens with the borehole 44 and its two borehole widenings 46 and 56 the lens is set onto the flange in such a manner that the relative position shown in FIG. 1, 2 & 4 is obtained, whereby the intermediate support formed by the intermediate layers 58 and 64 is fitted in between. Following this, the pin 40 is introduced from the front side 6 of the lens 4 into the borehole 44 and the aperture 50. (The pin 40 can also be introduced first into the borehole 44 before this pin 40 is brought into connection with the flange 2, together with the lens 4). The pin 40 is pressed with sufficient force into the aperture 50 than the lens 4 is clamped in without play between the connecting element 42 and the first protrusion 54 with a certain amount of compression from the two intermediate layers 58 and 64. Following this, the end of the pin 40 sticking out of the aperture 50 is removed.

By clamping the spectacle lens 4 between the connecting element 42 and the protrusion 54 the lens 4 and the flange 2 become fixed relative to one another in the direction of the axis of the pin 40. This clamping at once prevents any sort of relative turning between the flange 2 and the lens 4 around an axis at right angles to the previously mentioned axis. This fastening is accomplished without allowing the curvature of the front side 6 and the back side 8 to have an untoward effect. Neither the curvature of the back side 8 determines the course of the shank 24 and thus the angle of aperture of the spectacle nor does the curvature of the front side 6 determine the curvature of the front side 6, a buckling of the pin 40 or any eccentric point contact of the connecting element 42 with the spectacle lens 4. One important prerequisite for this favorable characteristic is the fact that it is not the front side 6 and/or the back side 8 of the lens that are employed for clamping the lens between the connecting element 44 and the shank 24, but solely the two borehole widenings 46 & 56, which act together with the complementarily formed connecting element 42 and the complementarily formed first protrusion 45.

The rotation around the axis of the pin 40 as well as of the aperture 50 not yet impeded by the above-described clamping between the connecting element 42 and the first protrusion 54 is prevented by means of a lock in the form of the second protrusion 60 and of the third protrusion 62, which because of their relatively large distance from the latter-mentioned axis of a rotation around it can can counterpoise a considerable momentum. The fastening device described thus, together with the three protrusions 54, 60 & 62 and the connecting element 42, forms a four-point anchoring for the spectacle lens 4 and the flange 2 and vice versa. By means of the additional support of the edge 14 of the flange 2 the entire connection described in the foregoing is braced, which causes a certain bending stress in the pin 40 and thus reinforces the unity from flange 2 and spectacle lens 4.

Figure 9:
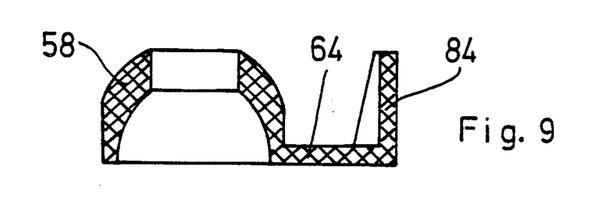
FIG. 9 is a modified preferred embodiment of an intermediate support.

In the above described preferred embodiment the intermediate support formed by the intermediate layers 58 and 64, which, since it is made of an elastic, pliable material, prevents stress concentrations and thus has the function of a cushion and can be termed as such. In additional, this intermediate layer can be used to affect the alignment of the lens 4 in relation to the component in the form of the flange 2. As indicated in the foregoing description, the actual contact between the first protrusion 54 and the borehole widening 56 takes place at the surface of the intermediate layer 58. At what interval from the remainder of the shank 24 the protrusion 54 supports the lens 4 on the borehole widening will thus depend on the position of the above-mentioned surface of the intermediate layer 58. Intermediate supports can be put to use in connection with an otherwise unaltered component in the form of the flange 2; these are the supports in the region of the intermediate layer 58 which have various thicknesses in the direction of the axis of the borehole 50. In FIG. 9 such an intermediate support is illustrated that is thicker in the area of the intermediate layer 58 than the intermediate layer shown in FIG. 1. In addition to this, the intermediate support shown in FIG. 9 has another intermediate layer 84 arranged between the second and third protrusion 60 & 62 and the border 10 of the lens 4 in the assembled state, such as has already been indicated previously as a possibility. If the intermediate support shown in FIG. 9 were inserted instead of the one depicted in FIG. 1, an alignment would result between the lens 4 and the flange 2 in which the flange 2 would appear somewhat shifted counterclockwise relative to the position shown in FIG. 1. This means in other words the angle of aperture would be slightly larger. In the manner described intermediate supports of varying thicknesses thus make it possible to set different angles of aperture in an otherwise constant geometry of the lens 4, including its borehole widening 56 and the flange 2.

This possibility putting the intermediate support and cushion to use can be especially exploited to make the core of the protrusion 54 on the shank 24 relatively flat and using the intermediate layer to bring it to the desired height or range in the direction of the axis of the borehole 50. This will make it possible also to deal with such lenses as for which the borehole widening 56 formed for a "normal" protrusion 54 in respect of the border thickness of the lens would be situated too deep in it or not penetrate into it deep enough.

In the following the preferred embodiment according to FIG. 5 through 8 is discussed, this in part conforming to the preferred embodiment discussed in the above. To the extent this accordance pertains the same reference numerals will be used for the same elements of the second preferred embodiment as for the first, and the second preferred embodiment will not be explained again. In the following only those characteristics of the second preferred embodiment will be described that differ from the first.

Figure 7:
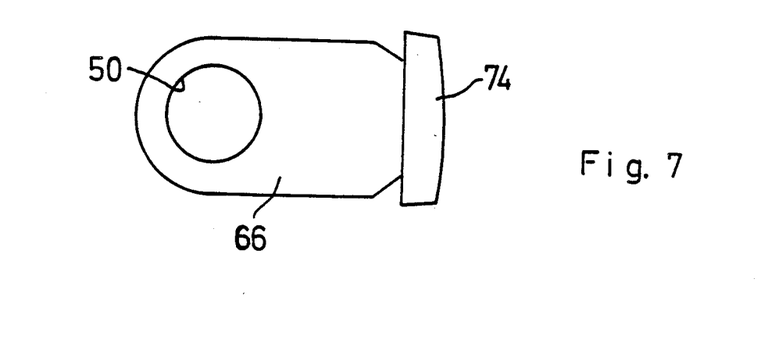
FIG. 7 shows an anchoring component used in the embodiment of FIG. 5.
Figure 8:
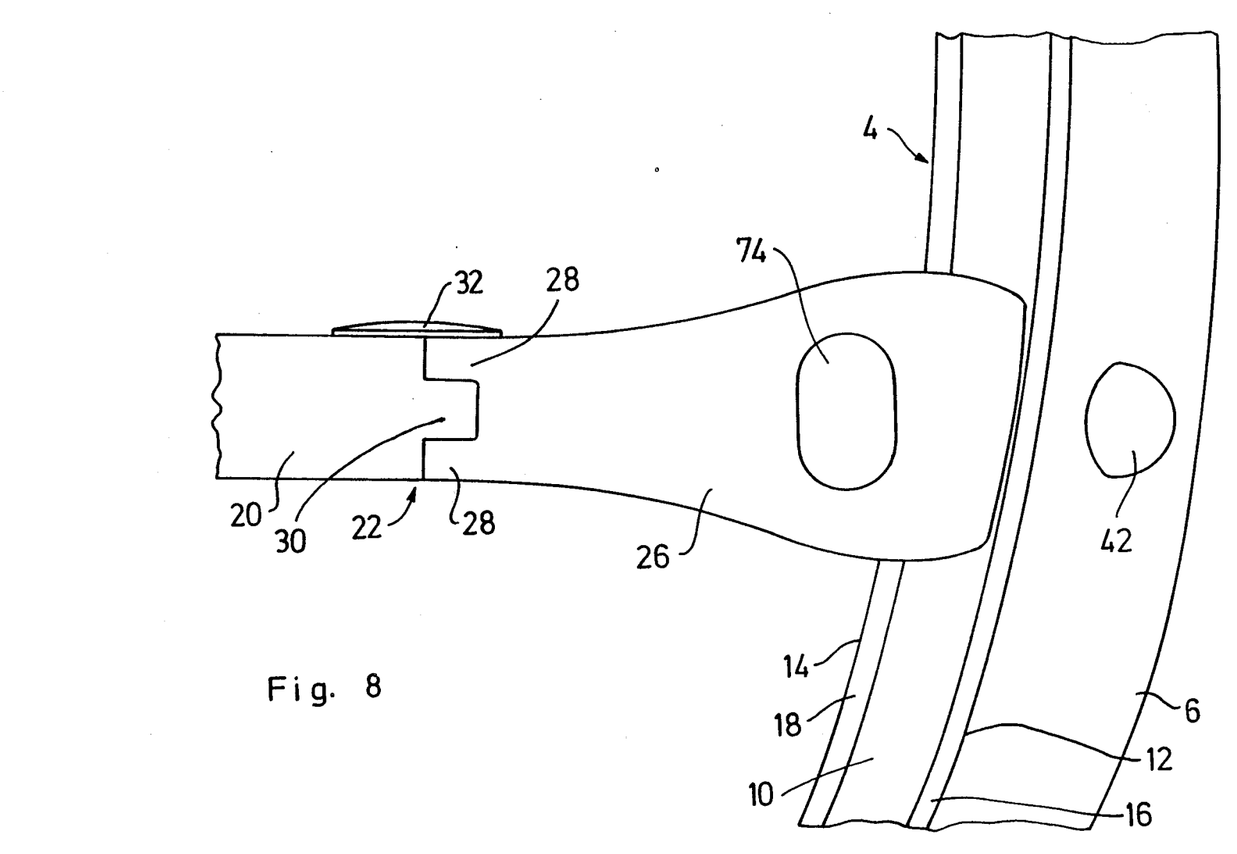
FIG. 8 is a side elevation embodiment of FIG. 5 looking in direction W.

In the second prefered embodiment the flange 2 comprises an anchoring component 66 having essentially the form of an elongated block (see FIG. 7). This anchoring component 66 sits in a slot 68 of the flange 2, the base of which slot runs essentially parallel to the level of the lens. This slot 68 is open to the back side 8 of the lens 4 and, in FIG. 5, to the left. The aperture 50 in the anchoring component 66 is shaped for accomodating the second end segment 48 of the pin 40. The function of this anchoring component 66 is to have the pin 40 anchored to it direct and by virture of its being secured to the remainder of the flange 2 the pin 40 is fastened indirectly to the remaining component in the form of the flange 2.

The second end segment 48 of the pin 40 can be fastened in the aperture 50 in any manner desired, as for example in the description for the first preferred embodiment. In the second preferred embodiment according to FIG. 5 through 8 a rivet connecting is provided. Accordingly, the aperture 50 is shaped as a smooth through-borehole and the free end of the pin 40 is flattened out into a rivet head 70. In the shank 24 a recess 72 has been formed which is large enough to accomodate the rivet head 70 when the anchoring component sits in its slot 68.

A notch connection has been provided to make a firm connection between the anchoring component 66 and the remaining component and this is comprised of a notch head 74 formed at the right end as seen in FIG. 7 of the anchoring component 66 and a notch hole 76 fitted to this in the arm 26. The notch hole 76 has a circumferential shoulder 78 which can intervene with the lower side of the notch head 74 and thus prevent the anchoring component 66 from shifting to the left, as seen in FIG. 5, as soon as the notch head 74 has been shifted so far to the right, as seen in FIG. 5, that it grips the shoulder 78.

Figure 5:
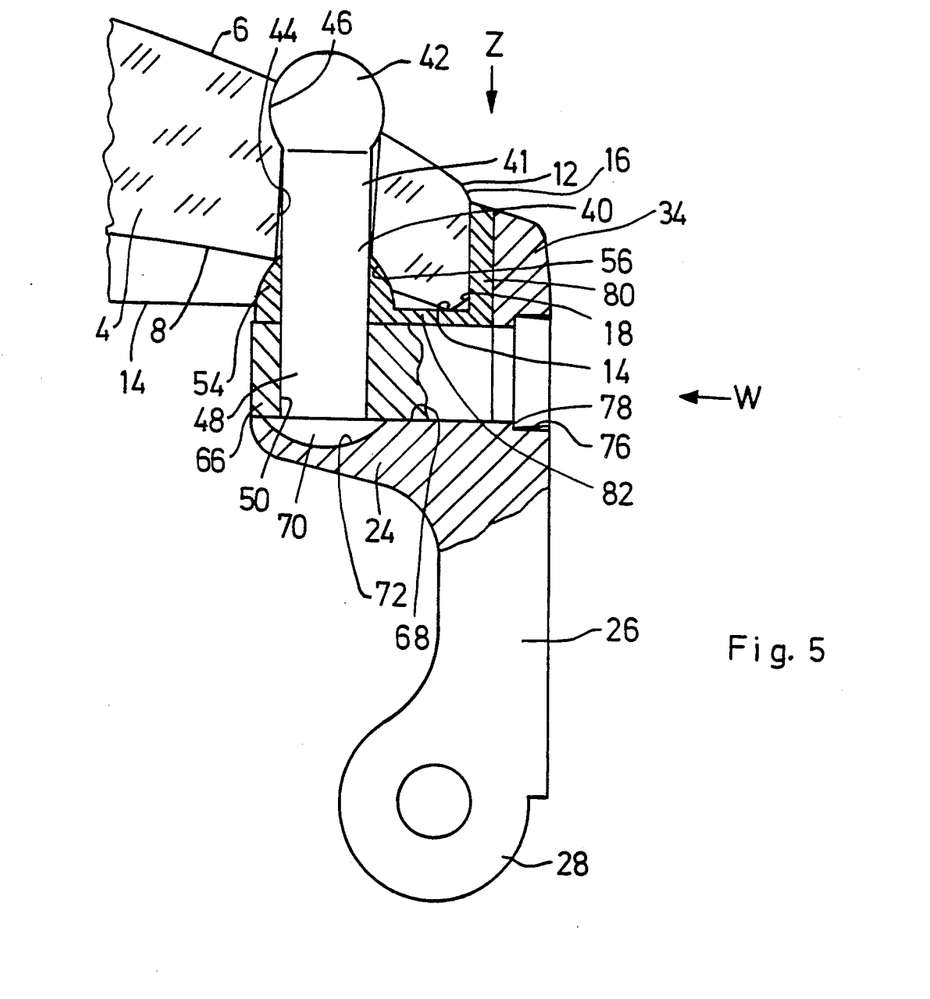
FIG. 5 is an elevation similar to FIG. 1 of a second preferred embodiment.
Figure 6:
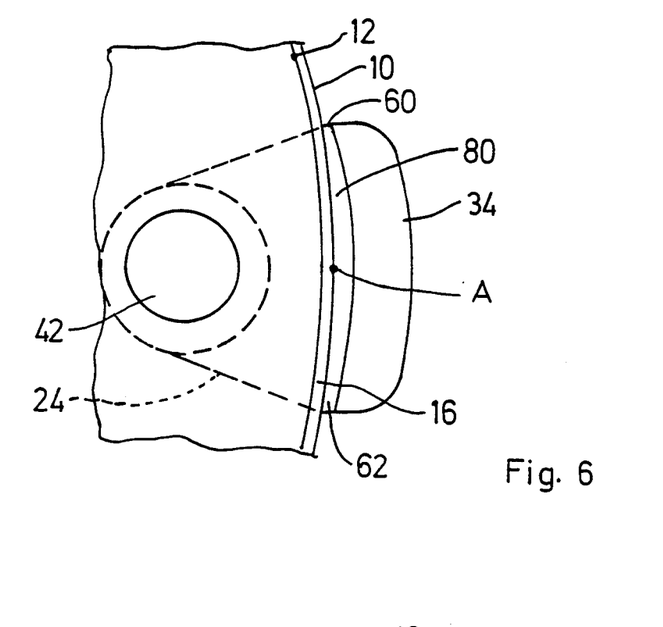
FIG. 6 is a plan view of the embodiment of FIG. 5.

While in the first preferred embodiment the first protrusion 54 is formed directly on the shank 24, in the second preferred embodiment, according to FIG. 5 through 8, it is formed separate from it. In addition, in the second preferred embodiment the second protrusion 60 and the third protrusion 62 are not formed directly on the extension 34, but as ends of a small plate 80 running along the border 10 of the shank 24. The plate 80 is formed in one piece with the first protrusion 54 and together with it forms a separate component part 82, which, as seen in FIG. 5, supports itself to the right on the extension 34 and below, also as seen in FIG. 5, on the shank 24, to which the anchoring component 66 belongs.

The component part 82 can be made in a similar manner to the intermediate support from the intermediate laters 58 & 64 and, if needed, the same 84 of the first preferred embodiment of an elastic, pliable material and can then fulfill the cushioning function of the intermediate support of the first preferred embodiment. The firmness of this elastically pliable material will preferably be selected from the standpoints that it will be pliable enough to accomodate manufacturing tolerances and inexactitudes and to prevent stress peaks, but also sufficient for the form to remain intact when assembled in order to guarantee a sufficiently rigid connection between the spectacle lens and the component. In practice this can mean that for thin and/or small spectacle lenses a softer material will be used than for thicker and/or larger lenses, which will weigh more. These remarks concerning the material also apply by analogy to the intermediate layer of this first preferred embodiment.

During the assembly of the second preferred embodiment first the spectacle lens 4 and the anchoring component 66 are put together with the interposition of the component part 82 and with the aid of the pin 40 are firmly connected to one another, whereby the pin 40 is provided with a rivet head 70. Thereupon the unit formed in this manner, consisting of the spectacle lens 4, the pin 40, the anchoring component 66 and the component 82, is fitted together with the remainder of the flange by introducing the anchoring component 66 into the slot 68 and pressing it far enough to the right, as seen in FIG. 5, that the notch head 74 is engaged in the notch hole 76. This connection between the anchoring component 66 and the remainder of the flange can be additionally secured by the application of cement. One especial advantage of the second preferred embodiment, according to FIG. 5 through 8, is that the anchoring of the pin 40 in the aperture 50 can be accomplished unimpeded by the other elements of the individual component or of the flange 2. For example, in the first preferred embodiment the shank 24 and the arm 26 must leave space enough for the protruding end of the second end segment 48 to be removed. This necessity is not a factor in the second preferred embodiment, according to FIG. 5 through 8. This means that the individual component or flange 2 can be designed without having to allow for space in the free end of the second end segment.

It will further be seen from FIG. 5 that the axes of the pin 40 and of the aperture 50 and the axis of the borehole 44 must not converge. These, rather, can form an acute angle and/or be set parallel to one another. In addition, the borehole 44 can have a larger diameter than the end segment 41, as also can be seen in FIG. 5. Such an excess is even to be preferred, so that the pin 40 within certain bounds can adjust itself freely in the borehole 44. The formation of the borehole 44 described above is possible, because it is not the course of the borehole 44 that determines alignment of the component relative to the lens 4, but the borehole widenings 46 and 56 in conjunction with the connecting element 42 as well as the protrusion 54.

As a variation from the first preferred embodiment, the boreholes 46 and 56 need not be formed concentric to the axis of the borehole 44, but rather can be formed eccentric with respect to this axis, as may be seen for the second preferred embodiment in FIG. 5. In this way the alignment of the component relative to the lens can be affected by the dimension and direction of this eccentricity. As FIG. 5 clearly shows, moving the borehole widening 56 to the right, as viewed in FIG. 5, relative to the borehole widening 56 shown there and thus relative to the axis of the borehole 44 would cause a larger aperture angle while moving it in the opposite direction would result in a smaller angle of aperture. Shifting the borehole widening 56 at right angles to the drawing plane out of its position shown there would analagouly change the angle of inclination. These possibilities for adjusting the alignment of the individual component in the form of the flange 2 relative to the lens 4 can be exploited in the practical manufacture of these spectacles by determining the angle of aperture for a given individual component, including given component 82, or given intermediate support by the depth of the borehole widening 56 and the angle of inclination by the eccentricity of this borehole widening relative to the borehole 44 at right angles to the drawing plane of FIG. 5.

Both plastics and metal, with the exception of the elastic intermediate support of the first preferred embodiment and of the possibly elastic component 82 of the second preferred embodiment, can be considered as material for all elements of the individual component and of the flange and pin. Preferably, however, plastics will be used exclusively.

It is understood that this invention is not limited to the preferred embodiments described in the above, but than within the framework of the basic idea of this invention it can be realized in other ways than in the preferred embodiments.

In this invention spectacles are treated in which the spectacle lens is secured by means of a fastening device to an individual component, as for example a flange. In the spectacle lens the two ends of a borehole are expanded into two borehole widenings, one of which is engaged with a first protrusion on the flange and the other with a connecting element, which is connected to a pin leading to the first protrusion. In addition, the flange has two additional protrusions which are supported on the border of the lens so that a four-point flange anchoring made secure by the pin against pulling and by the additional protrusions against rotating is created on the lens and vice versa. A certain flange is suitable for given border thicknesses and curvatures of the spectacle lens, because both on the front side of the lens and on the back side the gripping surfaces for the connecting element and the first protrusion are not defined by these front and back sides but by the widening of the borehole.

We claim:

1. A fastening device for connecting a spectacle lens having a borehole with an enlarged seat at each end thereof to an individual component in the form of a bridge, a flange or a temple articulation piece of a spectacle frame, said fastening device comprising a pin adapted to extend through the borehole, a connecting element on one end of the pin adapted to rest in one of the seats at one of the two borehole ends, a lock for preventing the individual component from rotating around the axis of the pin relative to the lens; said pin being connectable at its other end to a shank portion of the individual component arranged to extend approximately parallel to the lens; a first protrusion on said shank arranged to extend toward the lens and adapted to rest in the second borehole seat for clamping the lens between said connecting element and said first protrusion on the shank and said lock further having means on the individual component adapted to engage with the edge of the lens near said borehole at locations spaced from one another in the peripheral direction of the lens and being situated on opposite sides of a point on the lens edge located closest to the borehole.

2. A fastening device according to claim 1, wherein said connecting element and the pin are formed together in one piece.

3. A fastening device according to claim 1, wherein the pin and the shank are formed separate from one another and said shank has an aperture in which the second end of the pin reposes.

4. A fastening device according to claim 1, wherein the pin and the shank are formed separate from one another and the shank consists wholly or in part of an anchoring component having an aperture therein, said anchoring component being formed separate from the remaining individual component, yet being connectable to it, and said other end of the pin reposes in said aperture of the anchoring component.

5. A fastening device according to claim 4, wherein said anchoring component is a longitudinal element adapted to be located essentially parallel to the spectacle lens and being connectable on its one end with the remaining individual component by means of a notch connection.

6. A fastening device according to claim 4, wherein the connection between said other end of the pin and the shank and anchoring component is a screw connection.

7. A fastening device according to claim 4, wherein the connection between said other end of the pin and the shank and anchoring component is a notch connection.

8. A fastening device according to claim 7, wherein at least one notch is formed on one of the parts to be connected and the other part to which the connection is to be made has a smooth surface before the connection.

9. A fastening device according to claim 1, wherein said first protrusion and said shank on said individual component are formed together in one piece.

10. A fastening device according to claim 1, wherein said means adapted to engage the edge of the lens comprise second and third protrusions each formed as a cone or sphere segment.

11. A fastening device according to claim 1, wherein said means adapted to engage the edge of the lens comprise second and third protrusions each formed as a ledge adapted to be located essentially at right angles to the spectacle lens.

12. A fastening device according to claim 1, wherein said means adapted to engage the edge of the lens comprise second and third protrusions connected to one another by a surface adapted to engage the peripheral edge of the lens.

13. A fastening device according to claim 1, wherein said pin, said connecting element and said individual component are made of plastic.

14. Spectacles comprising:
at least one spectacle lens having a borehole therethrough;
individual components including a frame having a flange or temple articulation piece; and a bridge; and a device for fastening said lens to at least one of said individual components, said device comprising a pin extending through said borehole, a connecting element on one end of the pin, said borehole having a first seat at one end in which said connecting element is received, a lock for preventing rotation of said individual component around the axis of the pin relative to the lens, said pin being connected at its other end to a shank on said individual component extending approximately parallel to the lens; said lens having a second borehole seat formed on the other end of said borehold; said lock comprising a first protrusion on said shank extending toward said lens and resting in said second borehole seat clamping the lens between said connecting element and said first protrusion on the shank so that the lens is held at the surfaces of said borehole seats, and said lock further having second and third protrusions on the individual component engaged with the side edge of the lens near said borehole at locations spaced from one another in the peripheral direction of the lens and being situated on opposite sides of a point on the lens edge located closest to the borehole.

15. Spectacles according to claim 14, wherein at least one of the two borehole seats is concentric to the borehole axis.

16. Spectacles according to claim 14, wherein at least one of the borehole seats is formed eccentric to the borehole axis.

17. Spectacles according to claim 14, wherein the first seat and the connecting element reposing in it surfaces which are symmetrical about an axis of rotation surfaces.

18. Spectacles according to claim 17, wherein the surfaces are spherical face segments.

19. Spectacles according to claim 17, wherein the surface of the connecting element which faces away from the first seat is also a spherical face segment.

20. Spectacles according to claim 14, wherein the second seat and protrusion reposing in it have rotation symmetrical surfaces.

21. Spectacles according to claim 20, wherein the surface of the second seat and segment of the first protrusion are spherical segments.

22. Spectacles according to claim 14, further comprising a first intermediate layer of pliable material disposed between said first protrusion and said second seat.

23. Spectacles according to claim 22, further comprising a second intermediate layer of pliable material disposed between said second and third protrusions and said edge of the spectacle lens.

24. Spectacles according to claim 23, wherein said first and the second intermediate layers comprise a single piece disposed against said shank.

25. Spectacles according to claim 22, wherein said first intermediate layer is made from an elastic, pliable material.

26. Spectacles according to claim 14, wherein said connecting element and said first seat are arranged on a front side of the spectacle lens and that said shank of said individual component is located on a back side of the lens.

27. Spectacles according to claim 14, wherein said second end of the pin is connected to said shank by a cement connection.

28. Spectacles according to claim 14, further comprising an aperture in said shank receiving said second end of said pin, said second end of said pin protruding through said aperture and flattened into a rivet head.

* * * * *